Aug. 6, 1968  F. J. CARSON ET AL  3,396,000
METHOD OF AND APPARATUS FOR BENDING AND TEMPERING GLASS
SHEETS BY DIFFERENTIAL HEATING
Filed Sept. 26, 1966
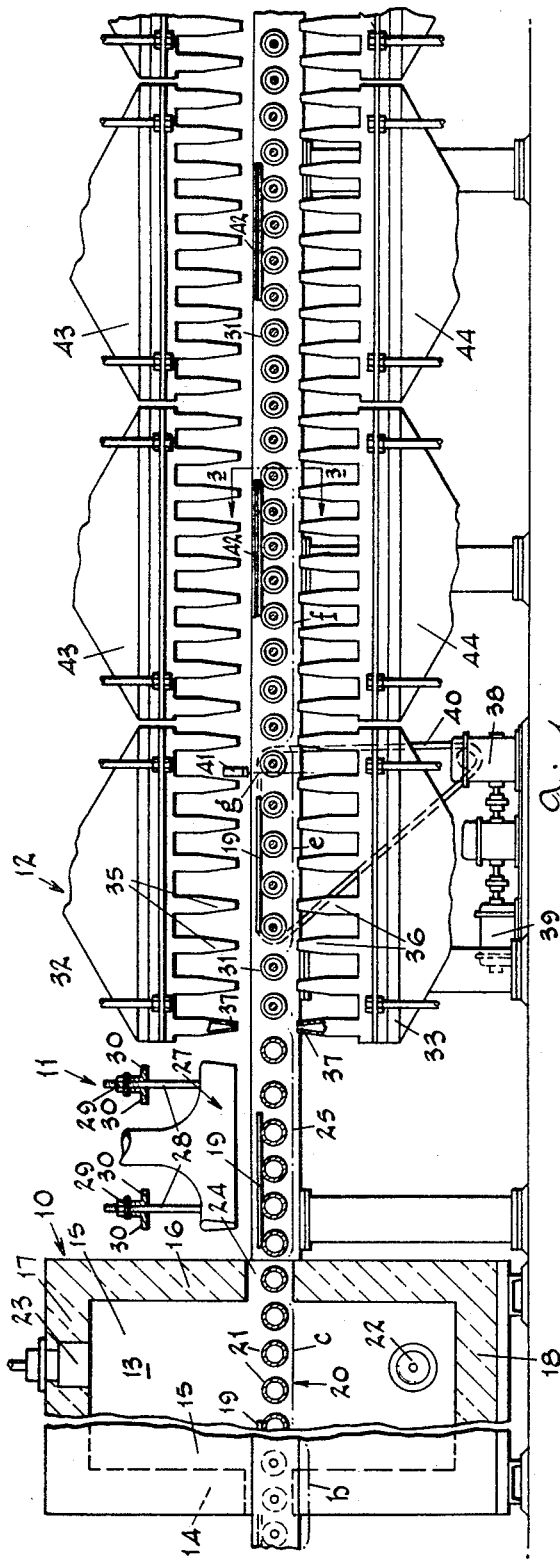
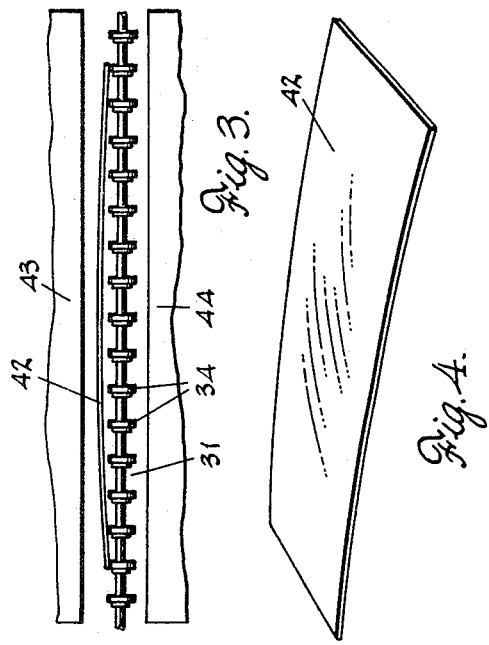
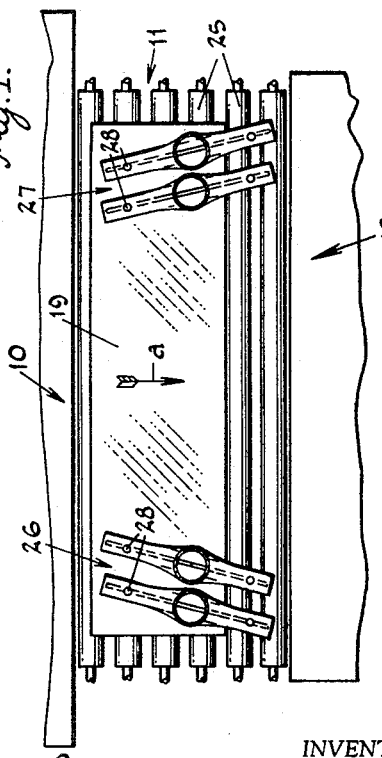
INVENTORS
Frank J. Carson, Charles W. Ferguson,
George F. Ritter, Jr.
and Frank J. Hymore
Nobbe & Swope
ATTORNEYS 3,396,000
METHOD OF AND APPARATUS FOR BENDING
AND TEMPERING GLASS SHEETS BY DIFFERENTIAL HEATING
Frank J. Carson, Toledo, Charles W. Ferguson, Perrysburg, George F. Ritter, Jr., Toledo, and Frank J. Hymore, Oregon, Ohio, assignors to Libbey-Owens-Ford Glass Company, Toledo, Ohio, a corporation of Ohio
Continuation-in-part of application Ser. No. 286,331, June 7, 1963. This application Sept. 26, 1966, Ser. No. 590,171
10 Claims. (Cl. 65—104)

ABSTRACT OF THE DISCLOSURE

A method of producing bent tempered glass sheets by first heating the sheet to substantially the softening point of the glass and then rapidly chilling opposite surfaces of the heated sheet at different rates to both temper the glass and bow the sheet to a desired curvature. The heating step may involve differential heating of the top and bottom surfaces and restricted areas of one surface of the sheet may be initially cooled to bend these areas before tempering and bowing the sheet to finished form. An apparatus for carrying out the method is also disclosed.

This application is a continuation-in-part of our co-pending application Ser. No. 286,331, filed June 7, 1963 now abandoned.

The present invention relates broadly to the bending of glass sheets or plates and more particularly to an improved method of and apparatus for producing bent tempered glass sheets.

In the bending of glass sheets or plates according to one well-known method, a flat sheet of glass is supported upon a so-called peripheral or outline type bending mold having a substantially continuous shaping surface curved in outline and elevation to the curvature to be imparted to the glass sheet. The mold and sheet are then passed through a bending furnace in which the sheet is heated to the softening point of the glass so that it sags by gravity into contact with the shaping surface of the mold and assumes the curvature thereof. The glass sheet can then be annealed or it can be tempered by subjecting the opposite surfaces of the heated sheet to jets or blasts of a cooling medium such as air.

An important object of this invention is to provide an improved method and apparatus for bending and tempering glass sheets or plates without the use of the customary bending molds.

Another object of the invention is to provide a method and apparatus of the above character in which a flat sheet of glass is first heated to bending temperature and then caused to bend to the desired curvature by subjecting the opposite surfaces of the sheet to a differential cooling.

A further object of the invention is to provide a method and apparatus of the above character in which the flat glass sheet to be bent is first heated to bending temperature such that one surface of the sheet is relatively hotter than the opposite surface, and then cooling the hotter surface of the sheet more rapidly than the cooler surface to cause the sheet to warp and bend to the desired curvature.

Other objects and advantages of the invention will become more apparent during the course of the following description when taken in connection with the accompanying drawings.

In the drawings, wherein like numerals are employed to designate like parts throughout the same:

FIG. 1 is a longitudinal vertical section through heating and cooling apparatus by which the method of this invention is to be practiced;

FIG. 2 is a plan view of a portion of the apparatus of FIG. 1;

FIG. 3 is a transverse vertical section taken on line 3—3 of FIG. 1; and

FIG. 4 is a perspective view of a glass sheet bent in accordance with the present invention.

Referring now to the drawings and particularly to FIG. 1, there is shown an apparatus for bending a glass sheet or successive glass sheets in accordance with the invention, said apparatus including, generally, a heating furnace 10, primary cooling section 11 arranged in close proximity to the exit end of the furnace for receiving the heated glass sheets therefrom, and a secondary cooling section 12.

The furnace 10 comprises a substantially closed heating chamber 13 defined by a front wall 14, side walls 15, rear wall 16, top wall 17 and a floor or bottom 18. Flat glass sheets 19 to be bent are conveyed through the furnace along a substantially horizontally disposed path by a roll conveyor 20 composed of a series of rolls 21 or other suitable conveying means.

The heating chamber 13 can be maintained a regulated temperatures by burners 22 located in the side walls 15 thereof beneath the roll conveyor 20 and by similar burners 23 in the top wall 17. The burners 22 and 23 are preferably arranged and operated in a manner to provide heat patterns or zones of progressively increasing temperatures from the entrance end to the exit end of the furnace. Further, in some instances, it may be desirable to regulate the fuel supply to the burners so as to maintain proportionately lower temperatures beneath the conveyor 20 than above the conveyor. One purpose of providing a relatively lower temperature beneath the conveyor is to maintain the bottom surfaces of the glass sheets at a relatively lower temperature than the upper surfaces thereby to reduce the tendency for these surfaces to become marred or distorted by contact with the conveyor rolls. Thus, when the bottom of the sheet is maintained at a lower temperature than the upper surface, there is less likelihood of the sheets sticking to the conveyor rolls, less likelihood of imperfections in the surfaces of the rolls being imparted to the sheet surfaces, and less likelihood of the sheets sagging between the rolls.

As the glass sheets are carried through the furnace 10, they will be progressively heated from substantially room temperature to substantially the softening point of the glass, at which point all strain will be removed from the sheet. To this end, when bending and tempering soda-lime-silica glass, the sheets are heated to a temperature between 1120° F. and 1240° F. before leaving the furnace and entering the cooling section. The sheets may be heated evenly throughout or, if desired for the reasons set forth above, the top surfaces may be heated to a slightly higher temperature than the bottom surfaces. In this connection, maintaining a temperature differential of approximately 30° F. to 40° F. between the top and bottom surfaces will, in most instances, render the sheet less susceptible to any distortion or surface mars resulting from contact with the conveyor rolls. By way of example, satisfactory results may be obtained with the invention by heating the upper surfaces of the sheets to a temperature of about 1160° F. to 1200° F. (preferably about 1180° F.) and the bottom surfaces to a relatively lower temperature of about 1120° F. to 1165° F. (preferably about 1150° F.).

Upon reaching the exit end of the furnace, the heated glass sheets 19 move through a slotted opening 24 in the rear wall 16 and are received on a series of conveyor rolls 25 which carry the sheets through the primary cooling section 11 and to the secondary cooling section 12. Arranged above the path of travel of the glass sheets in the primary cooling section between the exit end of the furnace and the entry end of the secondary cooling section are air sources consisting of pairs of elongated nozzles 26 and 27 (FIG. 2), positioned to direct streams of air toward the path in localized, spaced patterns of predetermined width substantially parallel to the path of movement of the glass sheet 19, designated by the arrow a. As shown, by way of example, the nozzles of each pair 26 and 27 are parallel with respect to one another and in angled relation to movement of the glass sheet to create an air pattern of desired width across the end areas of the sheet; said nozzles being adjustably supported in order that the effective width of such air pattern can be varied to suit the outline of the glass sheet passing therebeneath. For this purpose, each air nozzle is provided with threaded rods 28 by which it is supported by nuts 29 from a bar 30 and adapted to be adjustably positioned with respect to the opposed nozzle of the respective pair. In this way, the pairs of nozzles 26 and 27 establish a localized air pattern as the end areas of the glass sheet pass therebeneath to obtain the desired cooling action. The air pressure directed along the end areas of the glass sheets is relatively high and may be in the range of about 15" to 30" water pressure (preferably about 20").

As the glass sheets enter the secondary cooling section 12, they are received upon a series of conveyor rolls 31 and carried between one or more pairs of upper and lower blower heads, 32 and 33 respectively, operable to direct blasts of cooling air upon opposite surfaces of the sheets in a well-known manner to temper the glass. The conveyor rolls 31 comprise a plurality of spaced collars 34 for supporting the glass sheets to increase the effective area of the cooling action. The blower heads may either be provided with a series of independent nozzles through which the air is directed upon the sheets, or, as herein shown, be provided with spaced fins 35 and 36 extending transversely of the path of travel of the sheets and having slotted openings 37 to direct long narrow streams of air upon said sheets. The degree of cooling of the glass surfaces may be controlled by controlling the flow of the air against the sheet in any conventional manner such as by regulating the pressure of the air in the blower heads 32 and 33.

In the illustrative embodiment, the conveyor rolls 21 in section b adjacent the entrance end and extending through the major portion of the furnace 10 are rotatively driven to move the sheets at a linear speed of about 150 inches per minute. The conveyor rolls in section c adjacent the exit end of the furnace and the series of rolls 25 in the primary cooling section 11, are driven to move the sheets at a relatively higher linear speed, i.e., around 1040 inches per minute. As shown in FIG. 1, the initial group e of conveyor rolls 31 between the first pair of blower heads 32 and 33 is driven by a gear reducer unit 38 and motor 39 through a chain drive 40. The reducer unit 38 is operable to drive the group e of conveyor rolls alternately at a rate of speed comparable to the speed of the conveyor rolls 25 in the primary cooling section 11 and at a reduced rate of speed equal to that of the conveyor rolls 31 of the adjoining section f which extends through the remainder of the cooling section 12.

The operation of the reducer unit 38, and thus the speed differential of the conveyor rolls in section e, is automatically controlled by a signal device 41, such as a photoelectric cell and receiver unit. When the glass sheets pass from the rolls 25 in the cooling section 11 to the rolls 31 in section e, both sets of rolls will be driven at the same speed, i.e., about 1040 inches per minute. However, when the leading edge of a glass sheet 19 interrupts the signal beam g from the photoelectric cell 41, the speed of the rolls of section e will be reduced to move the sheets at about 150 inches per minute, and when the following or trailing edge of the sheet passes from the line of the beam the speed of the rolls will be automatically returned to their higher speed of around 1040 inches per minute.

In accordance with the present invention, upon emerging from the furnace, the upper and lower surfaces of the heated glass sheets are differentially cooled causing the sheet to warp or bend to the desired curvature. This differential cooling is accomplished in the present instance by directing more air against one surface than against the other thereby removing heat from this one surface at a faster rate than from the other surface. As mentioned above, a convenient and simple way of regulating the amount of air being directed on either of the surfaces is to regulate the pressure of the cooling air in the blower heads.

While the invention is not to be limited in any way to any particular theory, it is believed that the differential cooling of the top and bottom surfaces of the glass sheet causes a differential in the rate of contraction of these surfaces and that the sheet warps to compensate for this difference in rate of contraction. In any event, it has been observed that the sheet bows toward that surface which is being cooled at a faster rate. Thus, if the upper surface is being cooled at a faster rate, as in the illustrated embodiment, the sheet would bow upwardly away from the conveyor as shown in FIG. 3. This is believed to be due to the fact that the layer of glass at the surface being cooled at a fast rate sets before it contracts to any appreciable degree and while the remainder of the sheet is in an expanded condition. Then as the cooling continues, the rest of the sheet contracts to a greater extent than the one surface thereby bowing the sheet. It has also been found that at the time the sheet bows the convex surface is 75° F. to 150° F. cooler than the concave surface.

In the illustrated embodiment of the invention, upon leaving the furnace, the glass sheets are moved by the conveyor rolls 25 through the primary cooling section 11 and beneath the pairs of nozzles 26 and 27 located at the sides of the initial cooling section to direct streams of cooling air onto the upper surface of the end areas only of the sheet. This cooling of the end areas of the sheets has been found to produce a temporary upward curving of the opposite ends of the sheet. However, as the sheets move further along the path and pass beyond the nozzles 26 and 27 and into a position between the first pair of blower heads 32 and 33 located in the secondary cooling section, the cooling air directed against the upper and lower sheet surfaces tends to counteract the upward curving of the end areas of the sheet and cause the sheet to return to a flat condition. Now as the sheet continues along a path between the first pair of blower heads 32 and 33, the upper and lower surfaces of glass are subjected to differential air flows to effect the desired warping or bending of the sheet whereupon the entire sheet assumes the arched condition shown in FIG. 4.

The fins 35 and 36 of the blower heads 32 and 33 are arranged to direct the streams of cooling air to sweep the sheet crosswise from its leading edge to the trailing edge thereof, and in so doing, cause the sheet to warp or bend upwardly to the desired curvature. Due to the initial localized cooling of the upper surface of the end areas of the sheet these areas are caused to similarly bend and thus follow the curvature or arched condition in the central area thereof. In fact, the extent of cooling of the end areas has been found to have a definite bearing upon the degree of curvature of the end areas in the finally bent sheet.

The pressures of the air in the upper and lower blower heads may be varied depending upon the thickness and size of the glass sheet and the curvature desired. However, by way of example, the pressure of the air directed upon the upper surface of the sheet may range from about 14″ to 22″ of water (preferably about 17″) while the air pressure upon the bottom sheet surface may range from about 4″ to 8″ of water (preferably about 6″). These pressures are measured by a standard fluid pressure gauge, such as a manometer. During cooling the fins 35 and 36 are so located that the slots or orifices 37 thereof are approximately a distance of about 2″ from the surfaces of the glass sheets passing therebetween.

Usually the warping or bending of the glass sheet occurs as the sheet is conveyed between the fins 35 and 36 of the first pair of blower heads 32 and 33 so that as the bent sheet 42 enters between the second pair of blower heads 43 and 44 it will possess the desired curvature which may be as shown in FIG. 3. However, a differential air pressure may also be applied to the upper and lower surfaces of the glass sheet by the second pair of blower heads 43 and 44 which operate to "set" the curvature in the sheet as it moves forwardly through the final phase of its cooling. More particularly, the air pressure upon the upper surfaces of the sheets may range from about 10″ to 25″ of water (preferably about 20″) while the air pressure upon the lower surfaces of the sheets can be in the range of about 2″ to 6″ of water (preferably about 4″).

A glass sheet, bent and tempered in accordance with the invention, is illustrated in FIG. 4. While bent, tempered glass sheets produced by this invention may be used for various purposes, the invention is of particular utility in the making of bent, tempered back windows for automobiles and the glass sheet in FIG. 4 is representative of this type of window. Such windows are usually formed of ¼″ plate or sheet glass.

In practicing the method of this invention, it was also found that by adjustment of air pressure in the primary cooling section 11, the degree of curvature of the sheet can also be varied. Thus, pressure at the pairs of nozzles 26 and 27 can be regulated to cause selected areas of a glass sheet, particularly at the ends thereof to be bent to different curvatures. For instance, by initially subjecting the upper surface of the end areas to a higher pressure it is possible to produce bent sheets of glass having a major centrally disposed area of relatively shallow curvature and oppositely disposed end areas of a more sharply defined curvature.

It will be appreciated that the differential cooling of the sheet as described above causes the sheet to arch or bend through its longitudinal dimension or about its transverse axis. The degree of bending or warping depends upon the degree of differential cooling imposed on the major surfaces of the sheet and to some extent upon the manner in which the sheet is heated; that is, upon whether or not it was heated uniformly throughout or its opposite surfaces heated to different temperatures.

It is to be understood that the forms of the invention herewith shown and described are to be taken as illustrative embodiments only of the same, and that various changes in the shape, size and arrangement of parts may be resorted to without departing from the spirit of the invention.

We claim:

1. In the art of bending and tempering a substantially horizontally disposed glass sheet while being conveyed in a substantially horizontal direction as the sheet is heated to substantially the softening point of the glass and subsequently chilled to temper the glass, the improvement which comprises differentially chilling the top and bottom surfaces of the sheet to bow the glass into a preselected elevational configuration and tempering same and then further cooling the sheet to set the sheet in said bowed configuration and complete the tempering.

2. In a method of bending and tempering glass sheets wherein a horizontally disposed sheet is conveyed along a substantially horizontal predetermined path while being heated to substantially the softening point of the glass and subsequently chilled to temper the glass, the improvement which comprises subjecting the opposite surfaces of the heated sheet to chilling at preselected different rates to cause the sheet to bow or warp to a desired curvature, while it is being tempered.

3. A method of producing bent tempered glass sheets as defined in claim 2, in which the upper surface of the sheet is more rapidly chilled than the bottom surface thereof.

4. A method of producing bent tempered glass sheets as defined in claim 3, in which during heating of the sheet the upper surface of said sheet is heated to a higher temperature than the bottom surface.

5. A method of producing bent, tempered glass sheets comprising, supporting the sheet in a substantially horizontal plane, moving the sheet thus supported along a predetermined path, heating the sheet as it travels along said path to substantially the softening point of the glass, initially cooling restricted areas of one surface only of said sheet located at opposite sides of said path for a time and rate sufficient to bend said restricted areas to a predetermined curvature, then cooling the entire opposite surfaces of said sheet at different rates to further bend the same, and further cooling said opposite surfaces for a time sufficient to set the sheet to said curvature and to temper the glass.

6. A method of producing bent tempered glass sheets as defined in claim 5, in which during cooling of the opposite surfaces of the sheet the upper surface is cooled more rapidly than the bottom surface.

7. A method of producing bent tempered glass sheets as defined in claim 5, in which during the heating of the sheet to substantially the softening point of the glass the upper surface of the sheet is heated to a higher temperature than the bottom surface.

8. Apparatus for producing bent tempered glass sheets comprising means for conveying said sheet along a predetermined path, a heating furnace through which said sheet passes as it moves along said path, primary cooling means beyond said furnace for cooling restricted areas at opposite sides of the sheet of one surface of the moving sheet, secondary cooling means arranged above and below said path beyond said primary cooling means for cooling opposite surfaces of the moving sheet, and means for independently controlling the cooling action of the cooling means at opposite sides of said sheet.

9. Apparatus for producing bent tempered glass sheets consisting of a heating furnace, a primary cooling section and a secondary cooling section arranged substantially in line with one another, means for conveying the flat glass sheets in a definite horizontal path successively through said furnace, primary cooling section and secondary cooling section, means for heating the sheet as it passes through said furnace to substantially the point of softening of the glass, means at the sides of said primary cooling section for cooling the end areas of the upper surface only of the glass sheet as it passes through said primary cooling section, and means for cooling the entire upper and lower surfaces of said sheet as it passes through said secondary cooling section.

10. Apparatus for producing bent tempered glass sheets including a heating furnace, a primary cooling section and a secondary cooling section arranged in end-to-end relation beyond said furnace, means for conveying glass sheets in a definite horizontal path successively through said furnace, primary cooling section and secondary cooling section, means within the furnace for heating the glass as it passes therethrough to substantially its point of softening, means in said primary cooling section arranged at opposite sides of said furnace for directing streams of cooling air elongated in the direction of said path toward a limited restricted portion of one surface only of the moving glass sheet, and means in said secondary cooling section for directing streams of cooling air onto opposite surfaces of the moving sheet transversely thereof.

References Cited

UNITED STATES PATENTS

| | | | |
|---|---|---|---|
| 1,593,627 | 7/1926 | Gessner | 65—273 |
| 3,223,499 | 12/1965 | Cypher et al. | 65—104 |

DONALL H. SYLVESTER, *Primary Examiner.*

A. S. KELLOGG, *Assistant Examiner.*